US007435277B2

(12) United States Patent
Raussi et al.

(10) Patent No.: US 7,435,277 B2
(45) Date of Patent: Oct. 14, 2008

(54) GAS SEPARATION APPARATUS, A FRONT WALL AND A SEPARATION ROTOR THEREOF

(75) Inventors: Pekka Raussi, Kotka (FI); Matti Koivikko, Winterthur (CH)

(73) Assignee: Sulzer Pumpen AG, Winterthur (CH)

(*) Notice: Subject to any disclaimer, the term of this patent is extended or adjusted under 35 U.S.C. 154(b) by 112 days.

(21) Appl. No.: 11/455,229

(22) Filed: Jun. 16, 2006

(65) Prior Publication Data

US 2007/0006559 A1 Jan. 11, 2007

(30) Foreign Application Priority Data

Jun. 22, 2005 (FI) ................................ 20050674
Jul. 8, 2005 (FI) ................................ 20050733

(51) Int. Cl.
*B01D 45/14* (2006.01)

(52) U.S. Cl. ........................................ 55/406; 55/407

(58) Field of Classification Search .................. 55/400, 55/405, 406, 407, 408, 409, 434, 437, 438, 55/421; 95/261, 270; 416/146 R
See application file for complete search history.

(56) References Cited

U.S. PATENT DOCUMENTS 3,944,406 A * 3/1976 Jagusch et al. ................ 55/407
4,410,337 A * 10/1983 Gullichsen et al. ............. 95/22
4,521,151 A 6/1985 Frater
4,675,033 A * 6/1987 Fellman et al. ............... 96/217
4,776,758 A * 10/1988 Gullichsen ............... 415/169.1
4,826,398 A * 5/1989 Gullichsen .................. 415/143
4,877,424 A * 10/1989 Perkola et al. ................ 95/270
4,936,744 A * 6/1990 Dosch et al. ............. 415/169.1
5,087,171 A * 2/1992 Dosch et al. ............. 415/169.1
5,266,160 A 11/1993 Henricson et al.
5,462,585 A * 10/1995 Niskanen et al. .............. 95/261
5,921,748 A 7/1999 Frater
6,071,331 A 6/2000 Niskanen et al.

* cited by examiner

*Primary Examiner*—Duane Smith
*Assistant Examiner*—Sonji Turner
(74) *Attorney, Agent, or Firm*—Townsend and Townsend and Crew, LLP

(57) ABSTRACT

The present invention relates to a gas separation apparatus, a front wall and a separation rotor thereof. The invention especially relates to the modification of the separation rotor and/or the front wall of the gas separation apparatus in such a way that liquid or liquid suspension separated from a mixture containing gas and liquid or liquid suspension by means of said separation rotor may be recirculated as simply as possible back to the process flow at the same time as the gas separated from said liquid or liquid suspension is guided out of the process.

A characteristic feature of the gas separation apparatus comprising a front wall (50) and a separation chamber (62) arranged in communication with said front wall (50), a disc (60) mounted on the shaft (42) and located within said separation chamber, said disc dividing the separation chamber (62) to a so called front chamber (64), and a so called rear chamber (66), vanes (68) arranged to said disc (60), and at least one opening (70) for allowing gas-containing liquid or gas to enter the rear chamber (66) on the rear side of the disc (60), is that the front wall (50) surface facing the front chamber (64) is at least partially provided with ribs (74), by means of which the rotation of the liquid in the separation chamber (62) is prevented in the front chamber (64).

16 Claims, 2 Drawing Sheets

62
46
74
44
60
48
72
40
52
42
76
70
68
50
66
64
99

62
74
60
72
52
76
70
68
66
99
42
46
44
48
40
50
64

36
18
20,26
22
16
32
12
24
34
10
14
28
30

GAS SEPARATION APPARATUS, A FRONT WALL AND A SEPARATION ROTOR THEREOF

CROSS-REFERENCE TO RELATED APPLICATIONS

This application claims the priority of Finnish Application No. 20050674 filed on Jun. 22, 2005, and Finnish Application No. 20050733 filed on Jul. 8, 2005, the disclosures of which are incorporated herein by reference.

BACKGROUND OF THE INVENTION

The present invention relates to a gas separation apparatus, a front wall and a separation rotor thereof. The present invention especially relates to the modification of the separation rotor and/or the front wall of the gas separation apparatus in such a way that the liquid or liquid suspension separated by the separation rotor from a mixture containing gas and liquid or gas and liquid suspension may be recirculated as simply as possible back to a process flow as the gas separated from the liquid or liquid suspension is guided out of the process. The present invention may be applied in all such positions that gas separates from a process liquid flow to a certain spot in the flow, wherefrom the gaseous mixture, i.e. either a mixture of gas and liquid or gas and suspension, may be brought to the gas separation apparatus. It is especially advantageous to use a gas separation apparatus in accordance with the invention for separating, from the process flow, gas accumulated in the center part or some other cavity prevailing at a reduced pressure in rotary apparatuses. An advantageous rotary apparatus worth mentioning is a centrifugal pump or a specific gas separator.

The following description discusses both the prior art and the present invention more in detail in connection with centrifugal pumps. However, the invention is not intended to be limited to use with centrifugal pumps only, but the applications in connection with centrifugal pumps are merely shown as preferred embodiments of the invention.

There are previously known centrifugal pumps that are capable of separating gas. In those pumps the gas accumulates in front of the impeller of the pump forming a bubble from which the gas is discharged through openings in the backplate of the impeller to the cavity behind the impeller. Almost always some liquid or suspension to be pumped is entrained with the gas. The aim with the use of the vanes behind the backplate of the impeller is to attempt to separate liquid or suspension entering the rear side of the impeller from the separated gas in such a way that the liquid or suspension is returned around the outer rim of the backplate of the impeller to the liquid or suspension to be pumped and the gas is discharged along the pump shaft out of the pump.

It has, however, been shown in practice that in very many applications liquid or suspension is still entrained with the gas. In order to prevent the liquid or suspension to be pumped from being entrained with the gas to the suction apparatus, which may be, for example, a vacuum pump, a separate separation chamber has been arranged in connection with the so-called rear wall of the pump for a separation rotor. The mixture of gas and liquid or liquid suspension that has entered the cavity is, by means of the separation rotor, brought to such a vigorous rotational movement that practically speaking all liquid and possible solid material in the mixture gathers to the circumference of the separation chamber, from where it may be discharged and returned back to the liquid or suspension pumped or being pumped. A conventional structure comprises a gas separation rotor consisting of a hub of the separation rotor and radial or inclined vanes attached thereto. It is a typical feature of the gas separation rotors of the prior art that the intermediate spaces between the vanes (i.e. vane passages) are open from the hub to the outer rim so that the gas is allowed to flow from the vane passages substantially axially towards the gas discharge as easily as possible.

The discharge of liquid or suspension from the separation chamber is arranged along a separate channel arranged most usually outside the pump to take the liquid or suspension to the suction duct of the pump. The structure is, however, complicated and expensive to carry out.

On the other hand, there are known dynamic sealing arrangements used, for example, in centrifugal pumps, a substantial part of the sealing arrangements being an internal liquid cycle within the pump from a dynamic sealing chamber in connection with the rear wall of the pump back to the cavity behind the impeller of the pump. A dynamic seal is, as known, by its nature a seal, which is without any mechanical contact able to seal the centrifugal pump during the operation of the pump so that no liquid is allowed to flow along the shaft towards the bearing and the drive (on the right in the drawings). For example, U.S. Pat. No. 5,344,163 illustrates the structure and operational principle of the seal as well as the location of a conventional dynamic seal in the pump. The dynamic seal is thus located behind the volute of the pump in front of the pump bearing (seen from the direction of the suction duct) and in an annular chamber arranged in connection with a so-called rear wall of the pump, which chamber is in direct flow communication with the volute of the pump, where the impeller of the pump rotates. A rotating disc attached on the shaft of the pump divides the chamber into an impeller side cavity and a pump bearing-side cavity. The disc is provided with vanes on the side facing the bearing-side cavity, whereby it may also be called an expeller, while the other side of the disc is smooth. In case the annular chamber contains liquid, the vanes of the expeller tend to pump the liquid, first radially outwards, then around the outer rim of the expeller disc to the impeller side cavity of the chamber. Now, however, when the pump is in operation the pressure generated by the impeller to the volute of the pump effects to the opposite direction, whereby a balance is found where the liquid ring rotated by the expeller vanes neutralizes the pressure generated by the impeller and the pump is sealed in such a way that no liquid enters the shaft space in the bearing-side cavity of the chamber when the pump is in operation. However, when the pump is not in operation, the liquid to be pumped has free access around the rim of the expeller disc in the chamber to the shaft space and therethrough to the atmosphere, if it is not prevented in some suitable manner. For this purpose, a so-called static seal is used, which at its simplest is a rotary disc arranged round the shaft and pressed by the pressure of the liquid entering the shaft space against the counter surface preventing the flow of the liquid further.

A disadvantage relating to the dynamic sealing in view of the present problem, i.e. gas separation, is that it can be used neither with a gas-removing centrifugal pump nor with any other gas-separating rotary apparatus or apparatuses, because there is/are no opening(s) in the expeller disc of a conventional dynamic seal for the gas to be discharged.

One solution combining, in a way, features of a conventional gas separation chamber, of a gas separation impeller rotating therein and of an expeller of a dynamic seal for the purposes of gas separation is disclosed in publication WO-A1-90/13344 and in a partially sectional view in FIG. 1. The publication relates to a gas separator, in which a cage-like rotor 10 is used for generating such a vigorous centrifugal force field in the pulp of wood entering the apparatus that the gas in the pulp separates to the center of the apparatus. The separated gas is discharged from the center of the apparatus through openings 14 in the rotor disc 12 to the rear side of the disc and therefrom further through a gap between the hub 16 and the rear wall of the apparatus. In case pulp is entrained with the gas, a separation chamber 18 is arranged in connection with the rear wall of the apparatus, which chamber again is provided with a separation rotor attached on the shaft of the apparatus. The separation rotor comprises a hub 16, vanes 20 extending outwards therefrom and a solid annular disc 22 attached on the side of the vanes 20 facing the rotor 10, the disc dividing the separation chamber 18 to a front (rotor side) chamber 24 and a rear chamber 26. The operational principle of the separation apparatus is that the vanes 20 of the separation rotor swing the pulp that has entered within their reach to the outer circumference of the separation chamber so that no pulp is able to pass axially the separation apparatus. In other words, this far the principle has been the same as in the previously described gas-separating pump. Now, however, when the annular disc 22 attached to the vanes 20 of the separation rotor divides the separation chamber 18 into two parts, into the rear chamber 26 of which the vanes 20 pump the pulp, the pumped pulp may flow around the rim of the disc 22 to the front chamber 24. This has been facilitated so that a closing member 30 extends to the disc 22 from the rear wall 28 of the pump, the rear wall 28 of the pump acting as the front wall of the front chamber 24. The closing member 30 is used for closing the radial flow connection between the front chamber 24 and the shaft space, to which the separated mixture of gas and pulp first arrives. Correspondingly, openings 32 have been arranged, in the radial direction outside the closing member 30, through the rear wall 28 of the pump, the rear wall 28 acting as the front wall of the separation chamber 18, through which openings 32 the pulp entered to the front chamber 24 is returned to the space in front of the rear wall 28, in which rear vanes 34 of the disc 12 of the rotor 10 of the actual gas separation apparatus directs the pulp back to the process. Furthermore, it is worth noting that, in the apparatus in accordance with the publication, there are turbulence-generating vanes 36 on the surface of the disc 22 of the separation chamber 18, the surface facing the front chamber 24, by means of which vanes 36 clogging of the return openings 32 for pulp is prevented.

There are some disadvantages in the apparatus illustrated in FIG. 1. First of all, it is designed for relatively thick (high consistency) fiber suspensions, the flow dynamics of which considerably deviate from that of liquids and very low consistency suspensions of the present invention. For example, mere liquid or low consistency suspension rotates very easily in the separation chamber. While high consistency pulp requires rotary vanes generating turbulence to prevent the return openings from being clogged by pulp, the same vanes with mere liquid would intensify the rotation of the liquid in the separation chamber and would substantially harm the return of the liquid back to the volute of the pump.

SUMMARY OF THE INVENTION

The present invention aims at eliminating at least some of the problems and disadvantages of the prior art gas separators and gas separation apparatuses, by presenting a gas separation apparatus by means of which it is possible to remove gas from the liquid to be pumped.

It is a characteristic feature of the gas separation apparatus in accordance with the invention, comprising a front wall and a separation chamber arranged in connection therewith, a disc located therein and attached on the shaft, the disc dividing the separation chamber into a front chamber, and a rear chamber, vanes arranged on the disc and at least one opening for allowing the gaseous liquid or gas to enter the space behind the disc, that the surface of the disc facing the front chamber is smooth and that the surface of the front wall facing the front chamber is at least partially provided with ribs, by means of which the rotation of the liquid in the separation chamber is prevented in the front chamber.

It is a characteristic feature of the front wall used with a gas separation apparatus in accordance with the invention that the front wall is provided, on one of its substantially radial surfaces, with ribs extending substantially in a radial direction.

Further, it is a characteristic feature of a separation rotor used with a gas separation apparatus in accordance with the invention that the disc of the separation rotor is provided, on its one side surface, with substantially radially extending vanes, whereas the opposite side surface of the disc is smooth.

Other characteristic features of the gas separation apparatus, a front wall and a separation rotor thereof become evident in the accompanying claims.

A gas separation apparatus, a front wall and a separation rotor thereof are discussed below by way of example with reference to the accompanying drawings.

DESCRIPTION OF THE PREFERRED EMBODIMENTS

Figure 2:
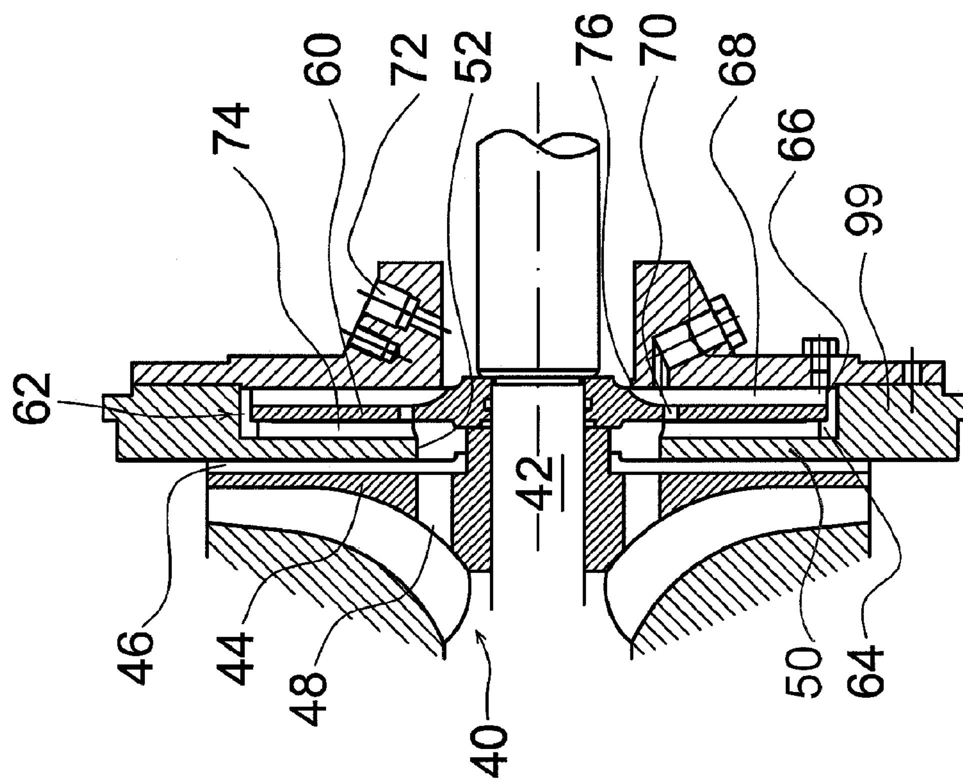
FIG. 2 illustrates a gas separation apparatus in accordance with a preferred embodiment of the invention in connection with a centrifugal pump.
Figure 1:
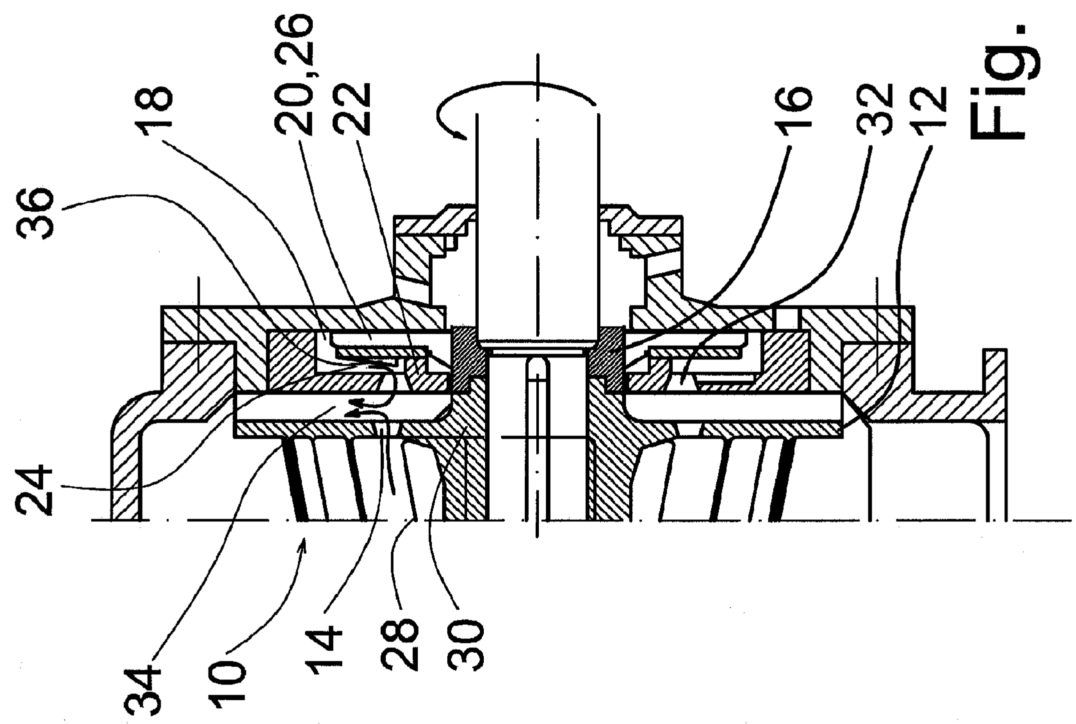
FIG. 1 illustrates an already previously discussed gas separator in accordance with the prior art.

FIG. 2 illustrates a gas separation apparatus in accordance with a preferred embodiment of the present invention, the separation apparatus being shown in an exemplary manner in connection with a centrifugal pump. In the figure, reference number 40 refers to an impeller of a centrifugal pump, which pumps, from the left along a suction duct (not shown), liquid entering the pump in a conventional manner to a pressure opening (not shown) of the volute of the pump. The impeller is attached to a shaft 42 of the pump, which shaft is mounted at the right with bearings to the bearing housing of the pump already cut away. The impeller 40 consists of working vanes on the front surface of the back plate 44 thereof and so-called rear vanes 46 on the rear surface of the back plate, which rear vanes contribute to preventing the flow of the liquid to be pumped from entering the other side of the so-called rear wall 50 of the pump. The rear vanes 46 may extend radially to the shaft 42 of the pump and they may also extend in the direction of the shaft 42 within the vicinity of the shaft further from the back plate 44 to the right towards the bearing of the pump.

The space in the pump behind the impeller extends axially up to the gas separation apparatus in accordance with the invention in such a way that the front wall 50 of the gas separation apparatus acts as the rear wall of the pump and extends at a small clearance to the rear vanes 46 of the impeller. The so-called separation rotor of the gas separation apparatus is attached to the same shaft 42 with the impeller 40 of the pump. The separation rotor preferably comprises a substantially radial disc 60, which is located in an annular separation chamber 62 arranged in connection with the front wall 50 of the gas separation apparatus. The rotary disc 60 attached on the shaft 42 divides the chamber 62, in this embodiment, into an impeller side cavity, a so-called front chamber 64 and a cavity on the pump bearing side of the disc, a so-called rear chamber 66 in such a way that there is a flow connection between the chambers from outside the outer rim of the disc 60. The disc 60 is provided with vanes 68 on its surface facing the rear chamber in the bearing-side cavity, the vanes 68 extending substantially over the radial width of the disc, whereas the opposite side surface of the disc is smooth. The purpose of the vanes 68 is to pump liquid in the rear chamber 66 outwards towards the front chamber 64, which again is affected in this embodiment by the pressure generated by the impeller 40 of the pump minus a counter pressure generated by the rear vanes of the impeller 40. In other words, a pressure from the rear chamber 66 towards the front chamber 64 and towards the impeller 40 of the pump is generated by vanes 68, by means of which the pressure prevailing in the space behind the impeller 40 is balanced. The direction of the vanes 68 is substantially radial, whereby the definition, however, covers the inclined or curved vanes that act as pumping vanes.

The previously described structure is in principle similar to the dynamic seals of the centrifugal pumps in the prior art. In the application concerning the centrifugal pump in accordance with FIG. 2, the impeller 40 further comprises a number of gas discharge openings 48, leading through the back plate 44, via which openings gas or gaseous liquid or suspension is allowed to flow from in front of the impeller (from the left) to a space therebehind. Of course, in some cases the structure of the pump is such that the gas discharge openings are not necessary, but gas is allowed to flow behind the impeller through some other route, for example, around the outer rim of the back plate of the impeller. In such a case, the vane passages are advantageously at least partially open, i.e. slots extending from the outer rim of the back plate towards the shaft.

In a similar manner, a rotary apparatus in front of a gas separation apparatus may be a gas separator, which subjects the liquid flow to be pumped, preferably the process liquid flow, to such a centrifugal or like force field generating pressure differences, which promotes the enrichments of gas in the liquid. It is also possible in some cases to take at some suitable spot of the liquid flow a partial flow, which due to the flow dynamics has been enriched by gas, and treat it by a gas separation apparatus in accordance with the invention. In other words, it is evident that the gas separation apparatus need not be located on the shaft of any other apparatus, but the gas separation apparatus may be a separate unit with a shaft and drive of its own.

In an exemplary pump of FIG. 2, the cavity behind the impeller 40 is limited by, as mentioned above, a so-called rear wall 50 of the pump, the rear vanes of the impeller 40 leaving a small clearance therebetween. The rear vanes 46 thus function in such a way that when the mixture of gas and liquid or mere gas is discharged via the impeller 40 openings 48 to the cavity behind the impeller, the rear vanes 46 direct a radial force specifically to the liquid component of the mixture, if such exists, by means of which the liquid tends to be returned to the liquid to be pumped around the outer rim of the back plate 44 of the impeller 40. The gas again tends to flow to the area of lower pressure towards the shaft 42 of the pump.

In order to be able to remove the separating gas from the pump in an axial direction, one or more holes or openings 70 of any shape have been arranged through the disc 60, through which openings gas or a mixture of gas and liquid is allowed to flow in principle from the front chamber 64 to the rear chamber 66 on the other side of the disc 60. The illustrated hole(s) or opening(s) 70 operate(s) in such a way that the gas-liquid mixture coming therethrough will come within the reach of the vanes 68 on the disc 60 of the separation chamber 62, whereby the vanes 68 pump the liquid fraction into the liquid ring circulating in the chamber 62 while the gas remains within the vicinity of the shaft. Therefrom the gas is allowed to be discharged from the pump, for example, along the channel 72. The excessive liquid that has entered the rear chamber 66 will flow to the liquid ring and, in the course of time when the liquid ring grows and extends in the front chamber 64 all the time closer to the shaft 42, is discharged round an inner edge 52 of the front wall 50 of the gas separation apparatus into the reach of the rear vanes 46 of the impeller 40 and further back to the liquid to be pumped. In order to make the return cycle in accordance with the invention more effective, stationary ribs 74 have been positioned on the surface of the front wall 50 facing the front chamber 64, by means of which ribs the rotation of the liquid (and the generation of the centrifugal force) is prevented in the front chamber 64. The ribs 74 preferably correspond of their radial dimension at least half of the free radial dimension of the chamber and are of their direction substantially radial. In fact, this definition includes that in some cases the direction of the ribs is preferably inclined and the ribs are curved in such a way that the outer end thereof is inclined towards the circulating liquid ring.

According to a further embodiment of the invention, the location and the size of the openings 70 in the disc 60 of the separation chamber 62 of the separation apparatus must advantageously be defined separately for each application. In order for the disc of the separation chamber 62 to operate in some limited conditions as a dynamic sealing, the size of the openings 70 has to preferably be such that some pressure loss will occur in the openings, but, on the other hand, the openings must not be so small that the solids, such as fibers, possibly entrained with the gas-liquid mixture would be able to clog any of the openings. Further, the pressure loss taking place at the openings 70 must, according to an embodiment of the invention, be greater than the pressure generated by the vanes 68 of the disc of the separation chamber. This kind of a solution ensures that a reasonable pressure difference is obtained in the pump application between the inlet pressure of the pump and the gas separation space behind the disc of the separation chamber. The pressure difference, on the other hand, ensures that in a number of applications the gas separation apparatus can be used as such; in other words the separated gas may be discharged directly to the atmosphere. Of course, in some more difficult applications it is possible to use some already known auxiliary equipment, such as a vacuum pump or a pressure valve.

In an exactly corresponding manner, the location of the openings 70 of the disc of the separation chamber 62 relative to the inner edge 52 of the front wall 50 of the gas separation apparatus has to be defined case by case. In a preferred embodiment, the openings 70 are located radially within the inner edge 52, in other words closer to the shaft 42. In an exactly corresponding manner the location of the openings 70 must be considered relative to the inner edge 76 of the rear wall of the rear chamber 66 on the other side of the separation chamber 62, too. Preferably, the inner edge 76 of the rear wall is radially inside the openings 70 so that the gas-liquid mixture flowing through the openings will not easily flow out towards the gas discharge channel, but the liquid remains within the reach of the vanes 68 and the gas will have to search the discharge route by approaching the shaft 42. In any case, the openings 70 are located relatively close to the shaft 42 of the disc 60 and of the impeller 40. In other words, the openings 70 in the disc 60 itself are located close to the central shaft opening of the disc. Of course, it is advantageous, however not necessary, that openings 70 are located within a certain distance outside the shaft 42 of the gas separation apparatus, because then a greater centrifugal force affects the liquid being discharged through the opening(s) 70 than in such a case that the openings were quite on the surface of the shaft 42. Further, the openings 70 are located within the reach of the vanes 68, whereby the vanes are able to transfer liquid fraction being discharged through the openings radially outwards.

Figure 3:
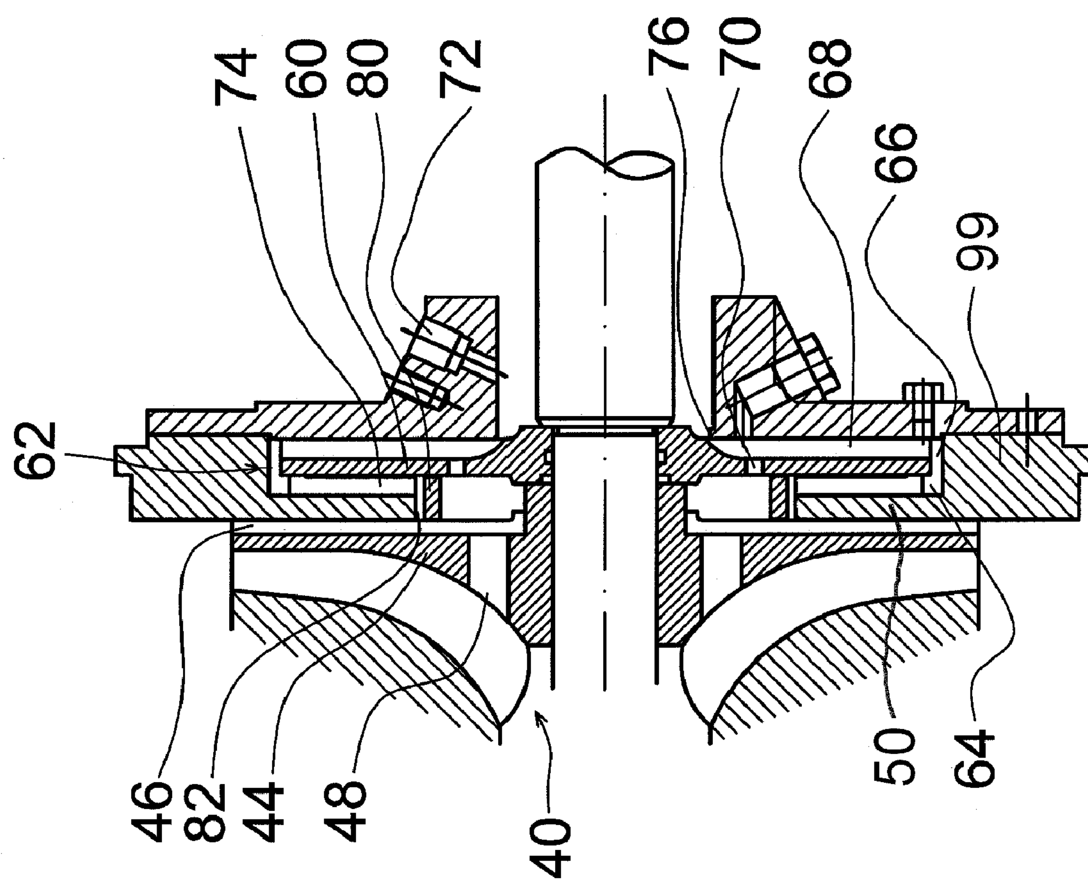
FIG. 3 illustrates a gas separation apparatus in accordance with another preferred embodiment of the invention in connection with a centrifugal pump.

FIG. 3 illustrates a structural solution of a gas separation apparatus in accordance with a second preferred embodiment of the invention. An embodiment illustrated in FIG. 3 deviates from the previous ones in that the central opening in the front wall 50 of the gas separation apparatus has a relatively large diameter. Correspondingly, a projection 80 has been arranged on the disc 60 of the separation chamber 62 substantially cylindrically and concentrically with the shaft of the separation apparatus, the projection being located, relative to the vanes 68 of the disc 60, on the opposite side of the disc and extending from the disc 60 inside the inner edge or rim 82 of the central opening of the front wall 50 of the gas separation apparatus. In the pump application the projection extends up to the rear vanes 46 of the pump impeller 40. When the flow passage, in the gas separation apparatus, for the process liquid, which is now returned, is an annular gap between the inner edge 82 and the projection 80 of the disc 60, one of the limiting surfaces of the gap being rotary, there is no risk of the clogging thereof by fibers or any other solid material in the liquid to be returned. In this embodiment, the rear vanes 46 of the impeller of the pump extend as previously up to the hub of the impeller or the shaft thereof.

Yet, in accordance with another embodiment of the invention, it is, however, possible to arrange in the case of a centrifugal pump a recess extending either to the whole axial dimension of rear vanes 46 of the pump impeller or to a portion thereof for the cylindrical projection 80 of the disc 60. Thereby, the gap between the projection 80 and the back plate 44 of the impeller 40 is made at least to some extent tighter, i.e. smaller.

The apparatus illustrated above in connection with different embodiments and with a centrifugal pump operates in such a way that when the pump has started and the liquid ring has been formed in the separation chamber in the same way as with the previously known pumps provided with a dynamic seal, gas or gaseous liquid flows through the openings 48 of the impeller to the rear side of the impeller 40. There the gas accumulates to the area of the lowest pressure on the shaft of the pump. In the gas separation chamber, the substantially same liquid circulates from the rear side of the disc of the separation chamber 62 to the front due to the action of the vanes 68 and from the front side to the rear side through the opening(s) 70. When gas has accumulated round the shaft of the pump to such an extent that the outer edge of the gas bubble extends to the opening(s) 70 of the disc 60 of the separation chamber, gas is able to discharge through the opening(s) 70 into the gas discharge space and therethrough, for example, through a conduit 72 out of the pump.

It must still be noted that when the inlet pressure of the pump varies, it also affects the operation of the liquid ring. When the pump inlet pressure increases, the pressure also increases in front of the opening 70 so that fresh liquid is able to flow through the opening to the rear side of the disc of the separation chamber. This results in the fact that the rotational radius of the liquid ring in the chamber 66 decreases. Quite similarly, when the pump inlet pressure decreases, the pressure in front of the opening 70 decreases, too, whereby the pressure generated by vanes 68 of the disc of the separation chamber is able to push some liquid around the inner edge or rim 52 of the rear wall 50 of the pump to the pump volute.

The operation of the gas separation apparatus, when the apparatus is not in connection with a centrifugal pump, is very similar. In fact, when the apparatus has been arranged in connection with another rotary apparatus, the operation is practically similar to the above. Further, when the gas and liquid mixture is taken to the apparatus directly from a flow, the operation of the apparatus does not substantially differ from the above described. It is, for example, possible to take the mixture of gas and liquid from the flow either directly by the pressure of the flow itself or by the pressure difference generated by a vacuum apparatus (which may also be used in the pump applications) possibly connected to the gas separation apparatus. Thereby, the mixture of gas and liquid may be axially brought to the apparatus and led through the openings 70 of the disc of the separation apparatus to a rear chamber behind the disc. In the rear chamber, the disc with its vanes separates the liquid fraction from the mixture and returns it through the front wall of the separation apparatus back to the process liquid.

It must also be noted that the invention relates not only to a gas separation apparatus and the whole centrifugal pump, but also to a front wall of the gas separation apparatus, and a separation rotor. The front wall of the gas separation apparatus in accordance with a preferred embodiment of the invention comprises a disc having a central opening for the shaft of the apparatus and ribs outside the opening protruding from the surface of the wall on one radial side of the wall, which ribs are substantially radial, that is, either radial or to some extent inclined or curved. The ribs are located, as becomes evident from above, in the assembled gas separation apparatus to the gas separation chamber thereof. Furthermore, in a further embodiment of the invention, there is a ring 99 axially extending from the surface of the ribbed wall at the outer rim of the front wall, the ring forming an outer circumference of the gas separation chamber in the gas separation apparatus.

As can be seen from the above description, it has been possible to develop an arrangement considerably simpler than the previous gas separation arrangements, which enable the return of the process liquid from the gas separation by utilizing the internal/inner channel arrangements of the apparatus. It must be noted from the above that in different situations different terms are used for the same component. In other words, it is a question of a front wall 50 of the gas separation apparatus or chamber, which in a centrifugal pump is also known as the rear wall of the pump. However, there is no risk of confusion, because the above description always refers either to a rear wall 50 of the pump or a front wall 50 of the gas separation apparatus. It must still be noted from the above that the invention is disclosed above only by means of some preferred embodiments. Their purpose is, however, not to limit the scope of the invention from what is defined in the claims, which alone define the scope of the present invention.

The invention claimed is:

1. A gas separation apparatus, comprising a front wall, a separation chamber arranged in connection therewith, a disc located in said separation chamber and attached on a shaft, said disc dividing the separation chamber into a so-called front chamber and a so-called rear chamber, vanes arranged on the disc and at least one opening for allowing liquid or gas to enter the rear chamber, wherein a surface of said disc facing the front chamber is smooth and wherein a surface of the front wall facing the front chamber is at least partially provided with ribs, by means of which the rotation of the liquid in the separation chamber is prevented in the front chamber.

2. The gas separation apparatus in accordance with claim 1, wherein said at least one opening in the disc is located close to the shaft substantially close to the area of an inner rim of the front wall of the gas separation chamber.

3. The gas separation apparatus in accordance with claim 1, wherein the distance of said at least one opening from the shaft is greater than the corresponding distance of inner tips of said vanes.

4. The gas separation apparatus in accordance with claim 1, wherein said at least one opening is located radially outside an inner edge of a rear wall of the separation chamber.

5. The gas separation apparatus in accordance with claim 1, wherein said at least one opening is flow-constricting, in other words capable of generating a pressure difference.

6. The gas separation apparatus in accordance with claim 1, wherein the disc of the separation chamber is provided with a cylindrical projection extending substantially axially towards the front wall, said projection being positioned radially outside said at least one opening.

7. The gas separation apparatus in accordance with claim 6, wherein the front wall is provided with a central opening having such a diameter that an annular gap is formed between an inner edge of the front wall and the projection of the disc.

8. The gas separation apparatus in accordance with claim 1, wherein said shaft acts simultaneously as the shaft of a centrifugal impeller of a centrifugal pump, and that the front wall acts as a back wall of said centrifugal pump.

9. A front wall for a gas-separating apparatus, said front wall comprising a substantially annular disc having a central opening, wherein the front wall is provided on its substantially radial surface with radially extending ribs.

10. The front wall in accordance with claim 9, wherein the front wall comprises a ring at the outer rim of the front wall, the ring extending substantially axially from the surface having the ribs.

11. The front wall in accordance with claim 9, wherein said front wall acts as a back wall of a centrifugal pump.

12. A separation rotor for a gas-separating apparatus to be used within a centrifugal pump having a volute and an impeller within the volute, said separation rotor comprising a substantially radial disc being provided with a central opening therein for a shaft and with one or more openings located at a distance of said central opening, wherein a radial side surface of the disc is provided with substantially radially extending vanes while the opposite side surface is smooth.

13. The separation rotor in accordance with claim 12, wherein said rotor is attached on a same shaft with a centrifugal impeller of a centrifugal pump.

14. A front wall in accordance with claim 9, wherein the gas separation apparatus is for use within a centrifugal pump having a volute and an impeller.

15. A front wall in accordance with claim 9, wherein the annular disc terminates freely at the central opening.

16. A centrifugal pump comprising a gas separation apparatus in accordance with claim 1 further comprising: a volute; an impeller within the volute, the impeller being attached on a rotatable shaft and having a back plate including a front surface with working vanes; and a rear wall of the pump acting as a front wall of the gas separation apparatus.

* * * * *